(12) United States Patent
Chen et al.

(10) Patent No.: US 7,199,729 B2
(45) Date of Patent: Apr. 3, 2007

(54) CHARACTER CODE CONVERSION METHODS AND SYSTEMS

(75) Inventors: Chien-Ting Chen, Taipei (TW); Chao-Lung Lee, Banciau (TW)

(73) Assignee: Mediatek Inc., Hsinchu, Taiwan (CN)

( * ) Notice: Subject to any disclaimer, the term of this patent is extended or adjusted under 35 U.S.C. 154(b) by 0 days.

(21) Appl. No.: 11/295,049

(22) Filed: Dec. 6, 2005

(65) Prior Publication Data

US 2006/0132336 A1    Jun. 22, 2006

Related U.S. Application Data

(60) Provisional application No. 60/637,991, filed on Dec. 21, 2004.

(51) Int. Cl.
*H03M 7/00* (2006.01)

(52) U.S. Cl. .................................. 341/50; 715/536

(58) Field of Classification Search ............ 341/50; 704/9; 715/536
See application file for complete search history.

(56) References Cited

U.S. PATENT DOCUMENTS 7,051,278 B1 * 5/2006 Ehrman ...................... 715/536

* cited by examiner

*Primary Examiner*—Rexford Barnie
*Assistant Examiner*—Joseph Lauture
(74) *Attorney, Agent, or Firm*—Thomas, Kayden, Horstemeyer & Risley

(57) ABSTRACT

A conversion method converting characters from a source character set to a destination character set. An index table, a key table, and an encoding table are provided. Source character code of a character is divided into a first part and a second part. A head offset and a tail offset are acquired in the index table according to the first part. The second part is searched in the key table based on the head offset and the tail offset. Destination character code of the character is retrieved from the encoding table matching to the searching result.

13 Claims, 3 Drawing Sheets

CHARACTER CODE CONVERSION METHODS AND SYSTEMS

This application claims priority over provisional application Ser. No. 60/637,991 filed Dec. 21, 2004.

BACKGROUND

The invention relates to character code conversion methods, and in particular to conversion of character code between two character sets utilizing a lookup algorithm.

Multilingual applications are commonly utilized in many different fields, including electronic communication, making character code conversion important. Conventionally, typical conversion of character code between two different character code sets employs to establishment of a one-to-one mapping table.

For example, if the original character set is Big-5/GB2312 and a destination character set is Unicode, a one-to-one mapping table is established prior to character code conversion. In this example, because there are 13504 total characters in the Big-5 character set and 7446 in the GB2312 character set, the one-way mapping table requires (13504+7446)×(2+2)=83800 bytes. A one-way mapping table can only accomplish one-way conversion, that is, from Big-5/GB2312 to Unicode or from Unicode to Big-5/GB2312. If two-way conversion is required, such as from Big-5/GB2312 to Unicode and Unicode to Big-5/GB2312, mapping table size must be doubled, 83800×2=167600 bytes.

Furthermore, efficiency of conversion can be seen to correspond with as the efficiency of binary searching in the mapping table, with complexity of N×logN, N=13504 or 7446. Obviously, the large mapping table reduces the calculation speed of the central processing unit (CPU), affecting performance. In some systems, such as electronic communication systems, memory size and CPU calculation ability are limited, such that conventional methods are not suitable.

For example, a Chinese character 我 is encoded as "0xA7DA" in the Big-5 character set, and "0x6211" in a Unicode character set. If character 我 is converted from the Big-5 to the Unicode character set, a mapping table is first established, as shown in Table I.

TABLE I

| Big-5 | Unicode |
|---|---|
| ... | ... |
| 0xA7DA | 0x6211 |
| ... | ... |

Table I is a mapping table for character conversion from Big-5 to Unicode. Because the Big-5 character set has total 13504 characters, Table I has 13504 entries. If the character 我 is converted from Unicode to Big-5, another mapping table is required. The number of the entries of the mapping table equals the number of characters included in the Unicode character set.

SUMMARY

An exemplary embodiment of a character code conversion method to convert characters from a source character set to a destination character set is provided. Source character code of a character is divided into a first part and a second part. The source character code is character code of the character encoded in the source character set. An index table, a key table, and an encoding table are provided. The index table is established by searching the source character set based on the same first part. The key table is established by arranging the source character code sequentially. The encoding table is established by setting the destination character set corresponding to the key table based on the first part and the second part. A head offset and a tail offset are acquired in the index table according to the first part. The second part is searched in the key table based on the head offset and the tail offset. Destination character code of the character matching to the searching result is retrieved from the encoding table.

DESCRIPTION OF THE DRAWINGS

The invention can be more fully understood by reading the subsequent detailed description and examples with references made to the accompanying drawings, wherein.

DESCRIPTION

Figure 1:
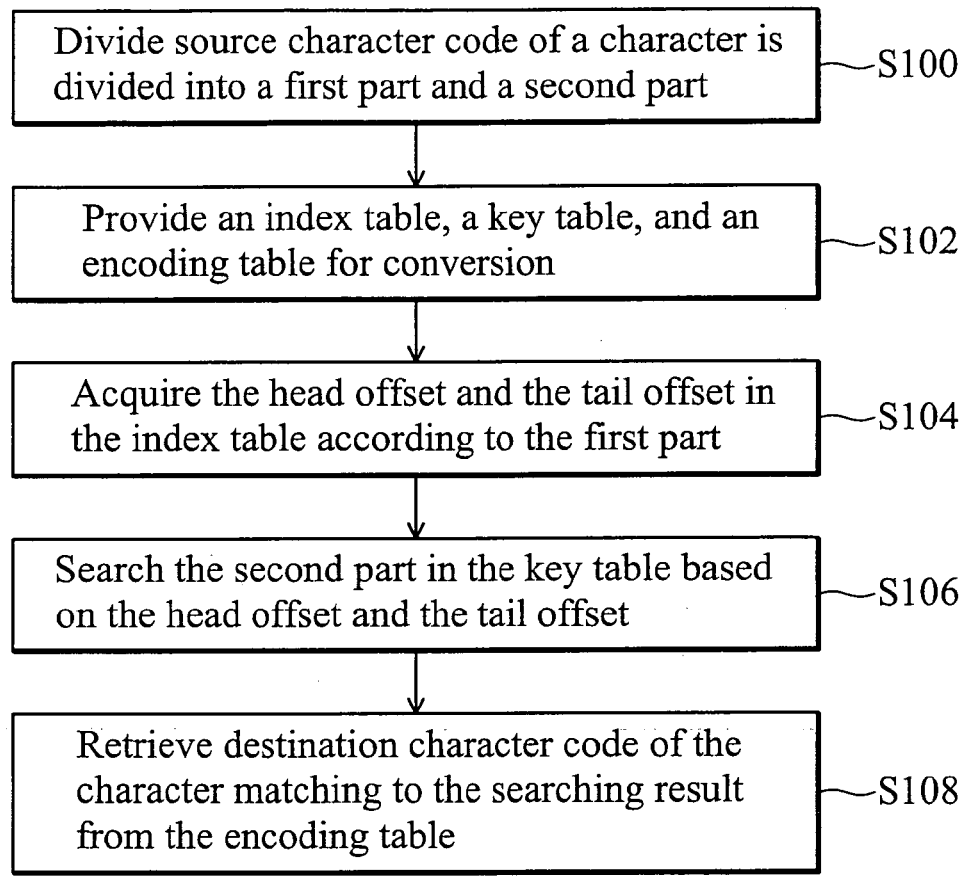
FIG. 1 is a flowchart of an embodiment of a character code conversion method.

FIG. 1 is a flowchart of an embodiment of a character code conversion method. Source character code of a character is divided into a first part and a second part (step S100). The source character code is character code of the character encoded in the source character set. In some embodiments, if the source code includes two bytes, the first part can be the first byte and the second part, the second byte.

An index table, a key table, and an encoding table are provided for conversion (step S102). Here, for the index table establishment, the source character code set is sought to calculate character numbers of the different second parts for each first part. The number of entries of the index table is equal to the number of first parts, and each entry corresponds to one first part. Therefore, the entries of the index table are ordered according to the sequence of the first parts.

Since various second parts may follow the same first part, the key table is established by recording the second parts based on the correspondence between the first and second parts. Therefore, the key table has a plurality recording ranges and each recording range corresponds to one first part for recording the second parts following that first part in sequence. Each of the recording ranges has a starting address and an end address in the key table, and each entry of the index table records the starting address as head offset and the end address as tail offset.

The encoding table is established by setting the destination code in the positions corresponding to the key table based on the first parts and the second parts of the source character code.

Here, the search of the characters can be a binary search. The key table and the encoding table can be integrated or separated according to actual requirements.

Thereafter, the head offset and the tail offset are obtained in the index table according to the first part (step S104). The second part is searched within a corresponding recording range in the key table based on the head offset and the tail offset (step S106). Destination character code of the character matching to the searching result is then retrieved from the encoding table (step S108). Destination character code is character code of the character encoded in the destination character set.

Figure 2:
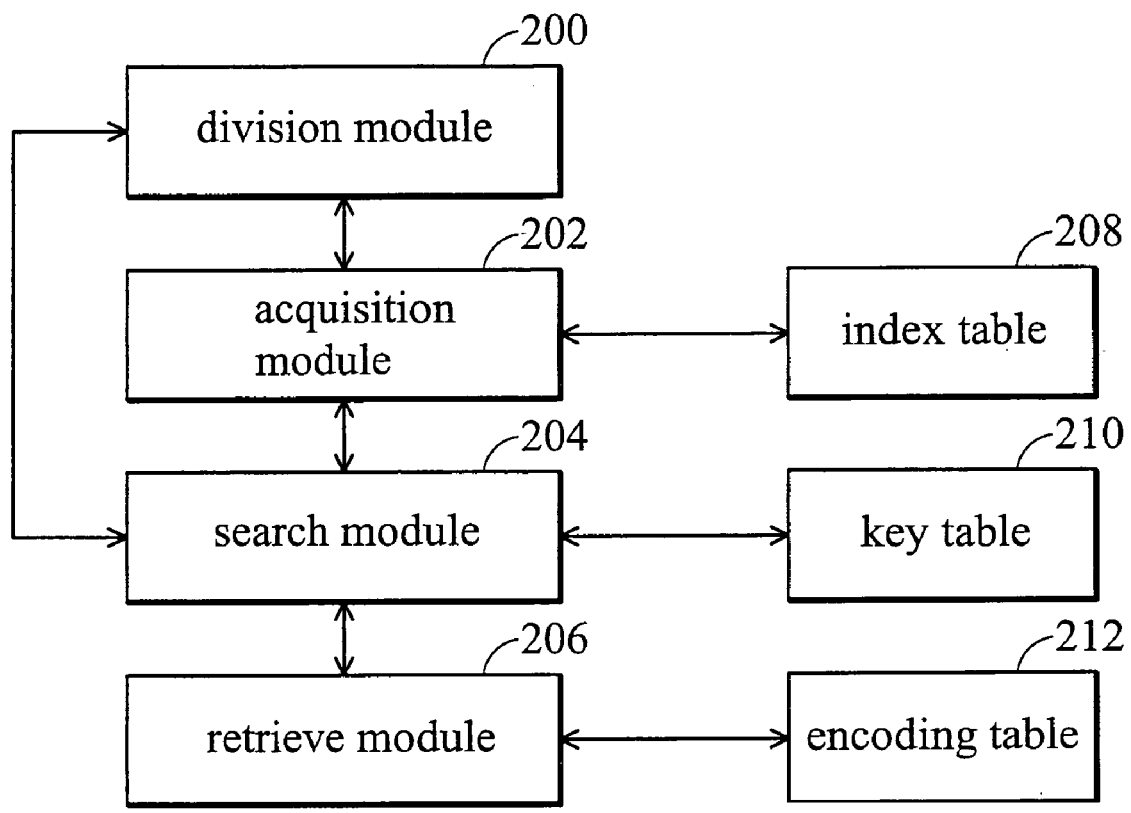
FIG. 2 is a diagram of an embodiment of a character code conversion system.

FIG. 2 is a diagram of an embodiment of a character code conversion system, comprising a division module 200, an acquisition module 202, a search module 204, and a retrieve module 206.

Here, an index table 208, a key table 210, and an encoding table 212 are provided for code conversion. The key table 210 is established by dividing the source character code into the first part and the second part, seeking the source character code set according to the first parts and second parts, and recording the second parts based on the correspondence between the first and second parts. The established key table comprises recording ranges and each of the recording ranges has a starting address and an end address in the key table.

The index table 208 comprises entries and each entry records the starting address of the recording range as the head offset and the end address of the recording range as the tail offset.

The encoding table 212 is established by setting the destination code in the positions corresponding to the key table based on the first parts and the second parts.

The division module 200 divides source character code of a character into a first part and a second part. The source character code is character code of the character encoded in the source character set. In some embodiments, if the source character code includes two bytes, the first part can be the first byte and the second part, the second byte.

The acquisition module 202, coupled to the division module 200 and the index table 208, acquires the head offset and the tail offset in the index table according to the first part. The search module 204, coupled to the division module 200, the key table 210, and the acquisition module 202, searches the second part within a corresponding recording range in the key table 210 based on the head offset and the tail offset. The retrieve module 206, coupled to the encoding table 212 and the search module 204, retrieves destination character code of the character from the encoding table matching to the searching result. The destination character code is character code of the character encoded in the destination character set.

Figure 3:
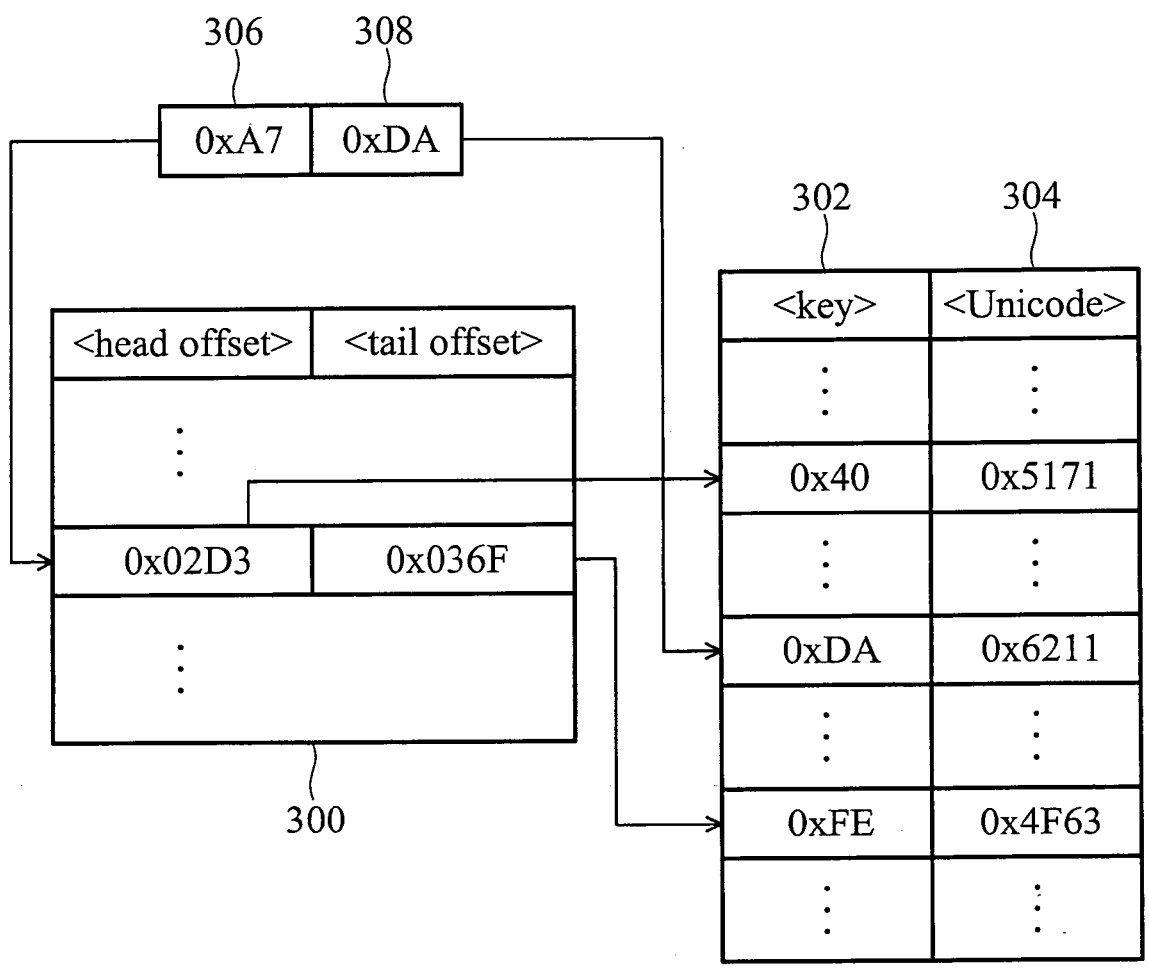
FIG. 3 is a diagram of an exemplary embodiment of character code conversion of a character.

FIG. 3 is a diagram of an exemplary embodiment of character code conversion for a character. For example, if the source character code set is Big-5/GB2312 and the first part 306 is the first byte and the second part 308 is the second byte. The source character code is divided into the first byte and the second byte. The index table may have total $2^8$=256 entries based on the first bytes of the source character codes.

The source character code set is sought according to the first parts and second parts. The key table 302 is established by recording the second parts based on the correspondence between the first and second parts, such as '0x40', '0xDA', and '0xFE' for the same first part '0xA7'. Thus, the established key table 302 comprises recording ranges and each of the recording ranges has a starting address and an end address in the key table. Here, for example, the starting address of the recording range corresponding to the first part '0xA7' is '0xa2D3' and the end address is '0x036F'.

The starting address and the end address are recorded as the head offset and the tail offset in the index table 300 as shown in FIG. 3. The head offset and the tail offset can be used as indices (a sub-array) in the key table 302 to search the second byte.

The encoding table 304 corresponds to the key table 302 by setting the destination code in the positions based on the first parts and the second parts correspondingly.

In the embodiment, after the tables are established and provided, characters can be converted from Big-5 to Unicode. Here, Big-5 character set is the source character set and the Unicode, the destination character set. A Chinese character 我 is encoded as "0xA7DA" in the Big-5 and "0x6211" in the Unicode. An index table 300, a key table 302, and an encoding table 304 are provided.

The source character code "0xA7DA" is divided into two parts. The first part 306 is the first byte, "A7", and the second part 308 is the second byte, "DA".

The first part 306, "A7", of the source character code is regarded as the offset in the index table 300 to retrieve the "<head offset>, <tail offset>" pair, the former is "02D3" and the latter is "036F," which constitutes a range (a sub-array) covering all possible second bytes following the first byte, "A7", including "DA," which is the second byte of "我" in Big-5.

The sub-array, from <head offset> to <tail offset>, is used in the key table 302 in binary search for the second byte of the source character code, "DA".

The matched result in the key table 302 retrieves the entry in the encoding table 304 (Unicode table), "6211". Thus, the destination character code for 我 is acquired. The character code is converted from Big-5 to Unicode.

Referring to the example, total table size for one way conversion will be the sum of the index table, key table, and encoding table. The size is (256×4)+(13504+7446)×(1+2)= 63874 bytes. Two-way conversion size is doubled, that is, 63874×2=127748 bytes. The provided methods increase efficiency by reducing search candidates. Here, the complexity is N×logN, less than 256.

Methods and systems of the present disclosure, or certain aspects or portions of embodiments thereof, may take the form of program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing and embodiment of the disclosure. The methods and apparatus of the present disclosure may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of preferred embodiment, it is to be understood that the invention is not limited thereto. Those skilled in this technology can still make various alterations and modifications without departing from the scope and spirit of this invention. Therefore, the scope of the present invention shall be defined and protected by the following claims and their equivalents.

What is claimed is:

1. A conversion method converting characters from a source character set to a destination character set, comprising:

dividing source character code of a character into a first part and a second part, wherein the source character code is character code of the character encoded in the source character set;

providing an index table, a key table, and an encoding table;

acquiring an entry in the index table according to the first part;

searching the second part in a recording range of the key table based on the acquired entry; and retrieving destination character code of the character matching to the searching result from the encoding table, wherein the destination character code is character code of the character encoded in the destination character set.

2. The conversion method as claimed in claim 1, wherein the key table is established by:

dividing the source character code into the first part and the second part;

seeking the source character code set according to the first parts and second parts; and recording the second parts based on the correspondence between the first and second parts;

wherein the established key table comprises at least one recording range and each of the recording ranges has a starting address and an end address in the key table.

3. The conversion method as claimed in claim 2, wherein the index table comprises at least one entry and each entry records the starting address of the recording range as a head offset and the end address of the recording range as a tail offset.

4. The conversion method as claimed in claim 1, wherein the encoding table is established by setting the destination code in the positions corresponding to the key table based on the first parts and the second parts.

5. The conversion method as claimed in claim 1, wherein the search of the character is a binary search.

6. The conversion method as claimed in claim 1, wherein the first part is the first byte and the second part is the second byte of the source character code.

7. The conversion method as claimed in claim 1, wherein the key table and the encoding table are integrated.

8. A conversion system converting characters from a source character set to a destination character set, comprising:

a division module, dividing source character code of a character into a first part and a second part, wherein the source character code is character code of the character encoded in the source character set;

a key table, comprising at least one recording range;

an index table, comprising at least one entry and each entry corresponds to one of the at least one recording range;

an encoding table, established by setting the destination character set in the positions corresponding to the key table based on the first parts and the second parts;

an acquisition module, coupled to the division module and the index table, acquiring an entry in the index table according to the first part;

a search module, coupled to the division module, the key table, and the acquisition module, searching the second part in one of the at least one recording range of the key table based on the acquired entry; and a retrieve module, coupled to the encoding table and the search module, retrieving destination character code of the character from the encoding table matching to the searching result, wherein the destination character code is character code of the character encoded in the destination character set.

9. The conversion system as claimed in claim 8, wherein the key table is established by a key table establishment procedure comprising:

dividing the source character code into the first part and the second part;

seeking the source character code set according to the first parts and second parts; and recording the second parts based on the correspondence between the first and second parts;

wherein the established key table comprises the at least one recording range and each of the at least one recording range has a starting address and an end address in the key table.

10. The conversion system as claimed in claim 9, wherein the index table comprises at least one entry and each entry records the starting address of the corresponding recording range as a head offset and the end address of the corresponding recording range as a tail offset.

11. The conversion system as claimed in claim 8, wherein the search of the characters is a binary search.

12. The conversion system as claimed in claim 8, wherein the first part is the first byte and the second part is the second byte of the source character code.

13. The conversion system as claimed in claim 8, wherein the key table and the encoding table are integrated.

* * * * *